Patented Oct. 31, 1939

2,178,099

UNITED STATES PATENT OFFICE 2,178,099

ORGANIC MERCURY COMPOUND AND A METHOD OF PRODUCING THE SAME

Karl Görnitz, Teltow, and Willy Harnack and Otto Wurm, Berlin-Friedrichshagen, Germany, assignors to Schering Aktiengesellschaft, a corporation of Germany No Drawing. Application September 25, 1935, Serial No. 42,027. In Germany September 29, 1934

19 Claims. (Cl. 260—431)

This invention refers to organic mercury compounds and more particularly to addition compounds of aldehydic carbonyl derivatives, mercury salts and unsaturated compounds, and a method of producing the same.

It is known that mercury salts are capable of addition to the double bonds of unsaturated compounds in the presence of hydroxy compounds serving as solvents, whereby at the same time said hydroxy compounds are added too. Thus, to take the simplest example, ethylene and mercury acetate dissolved in water yield a compound of the general formula

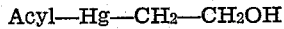

Acyl—Hg—CH₂—CH₂OH while from ethylene and mercury acetate in alcohol a compound of the general formula

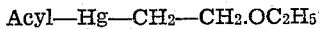

Acyl—Hg—CH₂—CH₂.OC₂H₅ is obtained.

Now, it has been found that likewise organic aldehydic carbonyl compounds are added when reacting mercury salts and unsaturated compounds in the presence of such aldehydic carbonyl compounds. It is surprising that thereby in a very simple manner and without reduction to or precipitation of mercuro salts or of metallic mercury, stable compounds are obtained; for, when using, for instance, aldehydes as aldehydic carbonyl compounds, reduction was to be expected.

Aldehydric carbonyl compounds that are especially suitable for this reaction, are the aldehydes in the ortho configuration, such as the chloral or bromal hydrates, or in the form of their semiacetals, such as the alcoholates of said aldehydes.

The semiacetals may be previously formed or produced during the reaction by carrying out the same in the presence of saturated or unsaturated aliphatic, aromatic, and alicyclic hydroxy compounds.

As mercury salt there may be employed, for instance, mercuric acetate, mercuric chloride, mercuric sulfate and the like, while the unsaturated compound used may be an aliphatic hydrocarbon that contains an ethylene linkage, such as ethylene itself, propylene, isobutylene and the like, or an aromatic compound, as styrene, and the like, or even a compound of the hydroaromatic series as cyclohexene, methyl cyclohexene and the like. The compounds obtained correspond most probably to the following structural formula

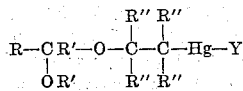

wherein R represents a halogenated alkyl radical, R' either hydrogen or a hydrocarbon radical, R" either hydrogen or the same or different hydrocarbon radicals which may be arranged in such a manner that they form a nucleus, and Y a negative radical, such as acetoxy or halogen or the like. This formula although not at all well founded, nevertheless represents the best formula which corresponds to the analyses of the products claimed.

The reaction which takes place results in the breaking of the double bond of the ethylene group and the linking in of the mercury salt radical on one carbon, and the aldehyde carbonyl on the other carbon of the ethylene group. The reaction may be expressed by the following equation where the reaction involves a hemiacetal:

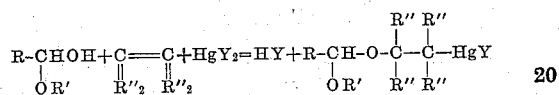

When the starting substances are aldehydes in the ortho configurations having the structural formula

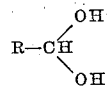

the above reaction results in compounds having the following structural formula:

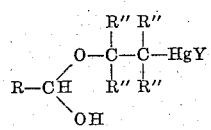

wherein R' represents a hydrocarbon radical.

The following examples serve to illustrate the invention without, however, limiting the same to them.

Example 1

41.3 grams of chloral hydrate are mixed with 15.9 grams of mercury acetate and liquefied by heating slightly. Into the molten mixture ethylene gas is passed in whereby about 1.4 grams of ethylene are absorbed in about 35 minutes. The reaction products is a glycerol-like oil, which may be termed α-trichlor-β-hydroxy-β-acetoxymercuriethoxyethane. The reaction may be expressed by the following equation:

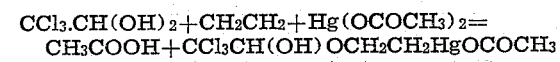

CCl₃.CH(OH)₂+CH₂CH₂+Hg(OCOCH₃)₂=
CH₃COOH+CCl₃CH(OH)OCH₂CH₂HgOCOCH₃

Example 2

294 grams of chloral are mixed while cooling, with 92 grams of ethyl alcohol. To this mixture 256 grams of mercury acetate and 264 grams of mercury oxide are added whereupon ethylene gas is passed in. The reaction mixture, on heating, combines within 20 minutes with 55 grams of ethylene. The α-trichlor-β-ethoxy-β(-acetoxymercuriethoxy-) ethane obtained thereby is a viscous sirup.

Likewise, when using mercury nitrate instead of mercury acetate, the calculated amount of ethylene is absorbed, although the reaction takes place more slowly, and α-trichlor-β-ethoxy-β(-nitrato mercuriethoxy-) ethane is produced.

*Example 3*

318 grams of mercury acetate and 236 grams of mercury oxide are mixed with the methyl semi-acetal of chloral as it is obtained from 294 grams of chloral and 64 grams of methyl alcohol. On passing ethylene gas through this mixture, 50 grams of ethylene are added within about 1 hour. The α-trichlor-β-methoxy-(β-acetoxymercuriethoxy-) ethane obtained thereby is liquid.

*Example 4*

A mixture of 63.6 grams of mercury acetate, 29.4 grams of chloral and 12.0 grams of isopropyl alcohol absorbs within 2 hours 5.6 grams of ethylene and yields the α-trichlor-β-isopropyloxy-β(-acetoxymercuriethoxy-)ethane.

*Example 5*

When using in Example 4 instead of isopropyl alcohol 14.8 grams of normal butyl alcohol, within 2 hours the α-trichlor-β-butoxy-β(-acetoxymercuriethoxy-)ethane is obtained.

*Example 6*

A mixture of 63.6 grams of mercury acetate, 29.4 grams of chloral and 17.6 grams of isoamyl alcohol adds 5.6 grams of ethylene within 2 hours thereby forming the corresponding isoamyl compound.

*Example 7*

31.8 grams of mercury acetate mixed with 23.1 grams of bromal and 4.6 grams of ethylalcohol absorb 2.8 grams of ethylene thereby yielding the corresponding brom compound.

*Example 8*

1/20 mol of mercury acetate and 1/20 mol of mercury oxide are mixed with 1/10 mol of trichloroacetaldehyde ethyl semiacetal whereupon the mixture adds 1/10 mol of propylene within 3 hours, which may be termed α-trichlor-β-ethoxy-(β-acetoxymercuriisopropyl-)ethane.

*Example 9*

1/20 mol of mercury acetate and 1/20 mol of mercury oxide are mixed with 1/10 mol of chloral methyl semiacetal. To this mixture 1/10 mol of cyclohexene is added slowly. In about 1 hour the mercury compounds are added whereby the α-trichlor-β-methoxy-β(-acetoxymercuricyclohexylhydroxy)ethane is obtained.

Methyl cyclohexene reacts in the same manner.

The compounds described herein are suitable for various technical applications, and they are specially suitable for use as disinfectants and fungicides.

Of course, as stated above the foregoing examples are merely illustrative and the invention may be applied to the wide variety of organic compounds represented by the general formula given. Thus, instead of the mercury compounds described, any other mercury compound which is suitable for the mercurization of organic compounds by previously known processes may be used.

What we claim, is:

1. A method of producing organic mercury compounds which comprises effecting a reaction between a soluble mercuric salt and an unsaturated hydrocarbon containing an ethylene linkage, with a halogenated aldehydic carbonyl compound.

2. A method according to claim 1 in which the reaction is carried out with a halogenated aldehydic carbonyl compound in the hydrate form.

3. A method according to claim 1 in which the reaction is carried out with a halogenated aldehydic carbonyl compound in the form of its semiacetal.

4. A method according to claim 1 in which the reaction is carried out with a halogenated aldehydic carbonyl compound in the hydrate form, and of a lower aliphatic saturated alcohol.

5. A method according to claim 1, in which the soluble mercuric salt is taken from a group consisting of mercuric acetate, mercuric chloride, and mercuric sulfate.

6. A method according to claim 1, in which the unsaturated hydrocarbon is an olefinic compound.

7. A method according to claim 1, in which the unsaturated organic compound is taken from a group consisting of ethylene, propylene, and the cyclohexenes.

8. A method according to claim 1, in which the aldehydic carbonyl compound is taken from the group consisting of chloral, bromal, and the corresponding hydrates.

9. A method according to claim 1, in which mercuric acetate is reacted with ethylene with chloral hydrate.

10. A method according to claim 1, in which mercuric acetate is reacted with an olefinic compound with chloral and a lower, aliphatic, saturated alcohol.

11. An organic mercury compound of the structural formula

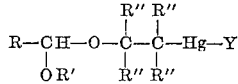

wherein R represents a halogenated alkyl radical, R' and R'' are taken from the class consisting of hydrogen and hydrocarbon radicals, and Y an acid radical taken from the class consisting of inorganic and lower fatty acids.

12. An organic mercury compound formed by the addition of a soluble mercuric salt to an unsaturated organic compound containing an ethylene linkage with an aldehydic carbonyl compound, the addition having taken place at said ethylene linkage, the compound being saturated.

13. The organic mercury compound of claim 12 in which the aldehydic carbonyl compound is in the hydrate form.

14. The organic mercury compound of claim 12 in which the aldehydic carbonyl compound has the configuration of a semiacetal.

15. An organic mercury compound formed by the addition of a soluble mercuric salt to an unsaturated organic compound containing an ethylene linkage with an aldehydic carbonyl compound and of a lower saturated aliphatic alcohol, the addition having taken place at said ethylene linkage, the compound being saturated.

16. α-trichlor-β(-alkoxy-β acetomercurial-koxy-)ethane of the structural formula $$CCl_3.CH.O-\underset{\underset{R'}{|}}{C}-\underset{\underset{R''}{|}}{\overset{\overset{R''}{|}}{C}}-Hg.O.CO.CH_3$$

wherein R' indicates an aliphatic hydrocarbon radical and R'' is taken from the class consisting of hydrogen and aliphatic hydrocarbon radicals.

17. An organic mercury compound comprising the reaction product of a soluble mercuric salt, an unsaturated hydrocarbon containing an ethylene linkage and an aldehydic carbonyl compound, the reaction product having no ethylene linkage and being saturated.

18. An organic mercury compound comprising the reaction product of a soluble mercuric salt, an unsaturated hydrocarbon containing an ethylene linkage, an organic hydroxy compound and an aldehydic carbonyl compound, the reaction product having no ethylene linkage and being saturated.

19. An organic mercury compound of the structural formula $$R-CH-O-\underset{\underset{R'}{|}}{C}-\underset{\underset{R''}{|}}{\overset{\overset{R''}{|}}{C}}-Hg-Y$$

wherein R represents a halogenated alkyl radical, R' and R'' are taken from the class consisting of hydrogen and hydrocarbon radicals, and Y an acid radical taken from the class consisting of inorganic and lower fatty acids, one pair of R'' radicals located on adjacent carbon atoms being hydrocarbon radicals, the latter being interconnected to form a ring having six carbon atoms.

KARL GÖRNITZ.
OTTO WURM.
WILLY HARNACK.